US005826333A

United States Patent [19]

Iketani et al.

[11] Patent Number: 5,826,333

[45] Date of Patent: Oct. 27, 1998

[54] METHOD OF MANUFACTURING AN INK JET HEAD

[75] Inventors: Masaru Iketani, Zama; Yutaka Koizumi, Yokohama; Toshio Kashino, Chigasaki; Seiichiro Karita; Haruhiko Terai, both of Yokohama; Kouichi Omata, Kawasaki; Hiroki Tajima, Machida; Yasuhiro Sawada, Chofu; Hiroshi Haruyama, Kawasaki, all of Japan

[73] Assignee: Canon Kabushiki Kaisha, Tokyo, Japan

[21] Appl. No.: 550,648

[22] Filed: Oct. 31, 1995

[30] Foreign Application Priority Data

| | | | |
|---|---|---|---|
| Oct. 31, 1994 | [JP] | Japan | 6-267057 |
| Oct. 30, 1995 | [JP] | Japan | 7-281618 |

[51] Int. Cl.6 .............................. B41J 2/16; G01D 15/18

[52] U.S. Cl. .................. 29/890.1; 29/25.35; 29/DIG. 44; 216/27; 269/21; 347/43; 347/63

[58] Field of Search ................................ 347/20, 42, 63, 347/67, 47; 29/889.22, 890.1, 25.35, DIG. 44, 830; 216/27; 269/21, 293

[56] References Cited

U.S. PATENT DOCUMENTS

| | | | |
|---|---|---|---|
| 4,994,825 | 2/1991 | Saito et al. | 347/63 |
| 5,045,142 | 9/1991 | Drake et al. | 156/278 |
| 5,098,503 | 3/1992 | Drake | 269/21 X |
| 5,192,959 | 3/1993 | Drake et al. | 347/42 |
| 5,208,604 | 5/1993 | Watanabe et al. | 347/47 |
| 5,243,755 | 9/1993 | Inabe et al. | 29/890.1 |
| 5,361,087 | 11/1994 | Tajima et al. | 347/47 X |
| 5,375,326 | 12/1994 | Usui et al. | 29/890.1 |
| 5,435,060 | 7/1995 | Hayes et al. | 29/890.1 |
| 5,479,685 | 1/1996 | Shimokata et al. | 29/25.35 |
| 5,665,249 | 9/1997 | Burke et al. | 29/890.1 |

FOREIGN PATENT DOCUMENTS

| | | | |
|---|---|---|---|
| 0528440 | 2/1993 | European Pat. Off. . | |
| 0670222 | 9/1995 | European Pat. Off. | 29/890.1 |
| 118873 | 9/1980 | Japan | 347/63 |
| 59-070587 | 4/1984 | Japan . | |
| 2-212162 | 8/1990 | Japan . | |
| 3-215048 | 9/1991 | Japan . | |
| 3216342 | 9/1991 | Japan | 29/890.1 |
| 4341860 | 11/1992 | Japan | 29/890.1 |
| WO95/11131 | 4/1995 | WIPO . | |

*Primary Examiner*—Peter Vo
*Attorney, Agent, or Firm*—Fitzpatrick, Cella, Harper & Scinto

[57] ABSTRACT

In an ink jet head manufacturing method wherein a plurality of substrates provided with ejection energy generating elements for generating energy for ejecting ink, are arranged on a supporting member, and a top plate is mounted on the substrate to cover all of the substrates to form ink flow paths, the improvement residing in that the supporting member is provided with recesses at a supporting portion for supporting the substrates, and an adhesive material is supplied into the recesses, and thereafter, the substrate is placed on the supporting member.

4 Claims, 19 Drawing Sheets

(a)

(b)

METHOD OF MANUFACTURING AN INK JET HEAD

FIELD OF THE INVENTION AND RELATED ART

The present invention relates to an ink jet head which is elongated by arranging a plurality of element substrates for effecting printing by ejecting liquid, and a manufacturing method therefor. It further relates to a device provided with the ink jet head.

Recently, an ink jet print type is widely used because the noise is low and because the high speed recording is possible. Among various types of ink jet printers, an ink jet head wherein thermal energy is applied to the ink by which the state change is produced in the ink, and the ink is ejected by the pressure resulting from thermal-expansion of the resultant gas (bubble jet type), is advantageous in that the responsivity to the print signal is high, and high density arrangement of the ejection outlets is relatively easy.

Recently, the data amount to be printed out increases. Particularly, when graphic data are to be printed out, the demand for the high speed print is increasing because the data amount in huge in that case.

Accordingly, an ink jet head of so-called full line type of the bubble jet type wherein ejection outlets and electrothermal transducers are arranged over the entire width of the printing material and an ink jet device having such an ink jet head, are expected as being the ones which permit the high speed printing.

As for such a full line type ink jet head, a method wherein all of the electrothermal transducers are formed in one substrate (heater board). However, in that case, if only one electrothermal transducer of the electrothermal transducers is defective, the entire substrate is not usable, with the result of very low yield. So, in a conventional full line type ink jet head, a plurality of heater boards having electrothermal transducers are combined. An a plurality of electrothermal transducers each having a relatively small number of electrothermal transducers such as 32–128 transducers, are supported on a supporting member at intervals matching the arrangement density of the nozzle. By doing so, even if one electrothermal transducer is defective, one heater heater board having the defective electrothermal transducer is exchanged. Additionally, the size of the heater board per se is small so that the manufacturing of the heater board per se is easy. Accordingly, the yield is remarkably improved. Such a structure is proposed in Japanese Laid Open Patent Application No. HEI-2-212162, for example.

By using the construction, the above-described advantages can be enjoyed, but another problem arises. With the above described construction, since a plurality of of heater boards are arranged in a supporting member, the arrangement accuracy is significantly influential to the printing quality. Conventionally, the arrangement accuracy is determined by the connection between the supporting member and the heater board or by the direct connection between the heater boards, and therefore, the processing accuracy of each construction member has to be strictly controlled. This also reduces the yield. When foreign matter is present between the construction members, the arrangement accuracy decreases with the result of influence to the printing quality. When the foreign matter is deposited between the heater board and the base plate, a step is formed on the heater forming the heater board with the result of gap in the contact plane between the heater board and the top plate. The gap may bring about cross-talk between adjacent nozzles with the result of improper printing.

SUMMARY OF THE INVENTION

Accordingly, it is a principal object of the present invention to provide stabilized printing without cross-talk by preventing gap formation between the heater board and the top plate. According to an aspect of the present invention, a supporting member for supporting the heater boards have recesses.

More particularly, there is provided an ink jet head manufacturing method wherein a plurality of substrates provided with ejection energy generating elements for generating energy for ejecting ink, are arranged on a supporting member, and a top plate is mounted on the substrate to cover all of the substrates to form ink flow paths, the improvement residing in that the supporting member is provided with recesses at a supporting portion for supporting the substrates, and an adhesive material is supplied into the recesses, and thereafter, the substrate is placed on the supporting member.

According to this aspect, the heater boards are independently supported by a supporting portion, which is provided with recesses. Thus, the contact area between the heater boards and the base plate is decreased, so that the step on the heater board resulting from the foreign matter deposited to the contact surfaces is prevented from being formed, and therefore, an ink jet head having high reliability without improper printing such as cross-talk, can be provided.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Referring to the accompanying drawings, the embodiments of the present invention will be described.

Embodiment 1

Figure 1:
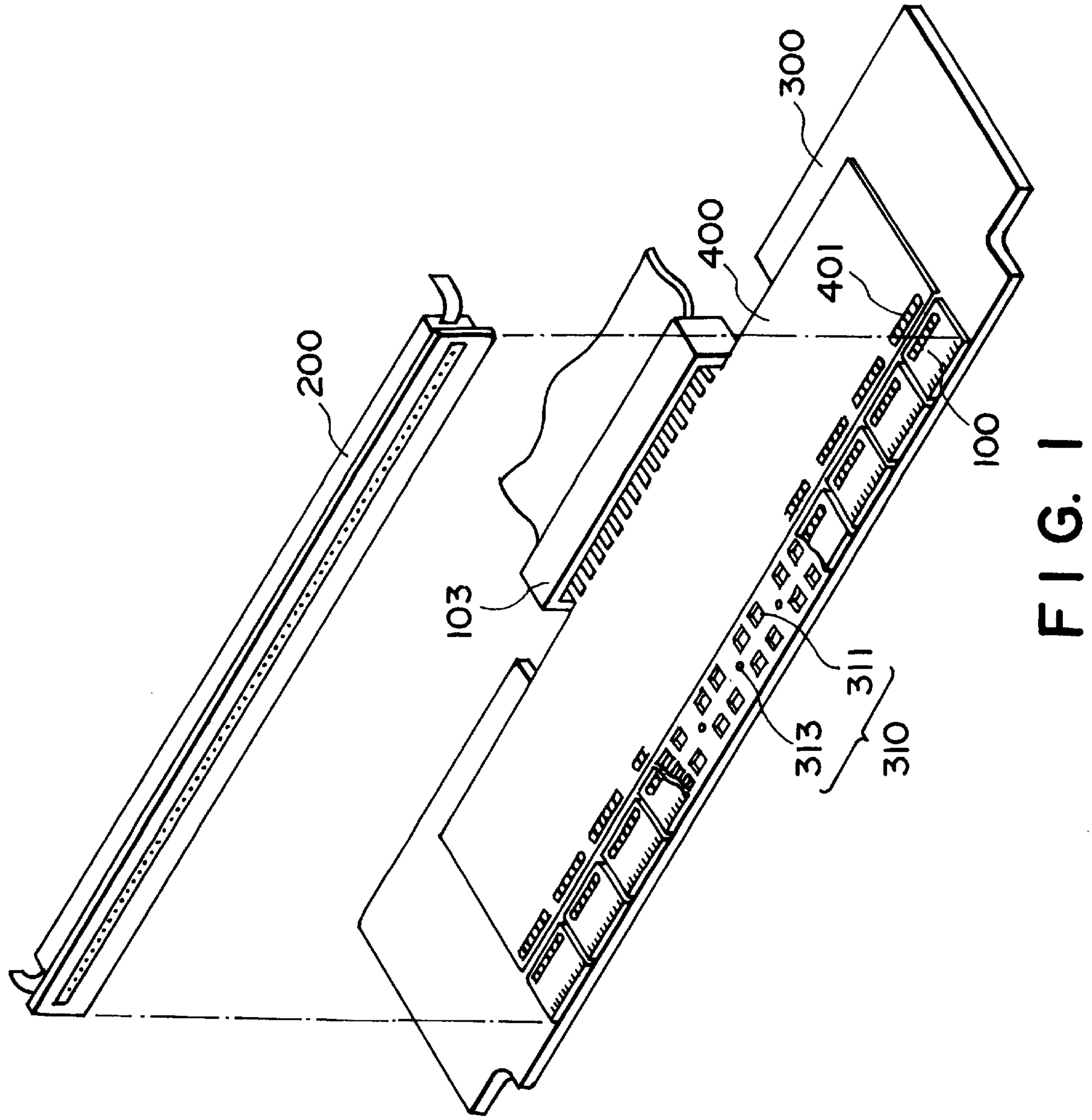
FIG. 1 is a schematic view showing a construction of elongated ink jet head using a base plate provided with a seating for HB (heater board).

FIG. 1 is a schematic view showing a construction of an elongated ink jet head using a base plate provided with a seating for HB position.

In FIG. 1, designated by 100 is a heater board (which will also be called HB) having electrothermal transducer elements for generating thermal energy to eject the ink. The HB is of monocrystal silicon, polycrystal silicon, glass, metal or ceramic or the like, and the electrothermal transducer elements are formed on the HB by thin film manufacturing technique or the like. Designated by 300 is a base plate for supporting the heater boards, and the base plate 300 is of glass alumina, sapphire, silicon, metal, for example. Designated by 310 is a seating functioning as a supporting member for HB positioning on the base plate. The seating supports the HBs independently from one another, and is integral with the base plate in this embodiment. By precisely forming the portions corresponding to the HBs of the seating, they can be used as rough index when the HBs are positioned thereon. Designated by 313 is a sucking opening in the seating 310 portion to assure the position of the HBs. Designated by 400 is a wiring substrate electrically connected with the HB to transmit the driving signal from the main assembly of the device, and is provided on the base plate similarly to the HB. The wiring substrate 400 and the HB are electrically connected by wire bonding. The wiring substrate 400 is electrically connected with the main assembly of the device by a flexible cable 600, and the flexible cable 600 and the wiring substrate 400 are connected by a connector 700. Designated by 200 is a top plate for formation of flow paths by coupling with the HB on the base plate, and the top plate 200 is provided with ejection outlets for ejecting the ink and flow path grooves for forming the flow paths, integrally. It is joined to the HB 100 so that the flow path grooves and said electrothermal transducer elements correspond with each other.

The materials of the top plate 200 may be any resin material if the grooves can be formed precisely. Preferably, the material exhibits high mechanical strength, dimensional stability and ink-resistant property. Examples of the material include epoxy resin material, acrylic resin material, diglycol, dialkyl carbonate resin material, unsaturated polyester resin material, polyurethane resin material, polyimide resin material, melamine resin material, phenolic resin, urea resin material or the like. From the standpoint of molding property and liquid-resistant property, polysulfon, polyester polysulfon or the like resin material are desirable.

Figure 2:
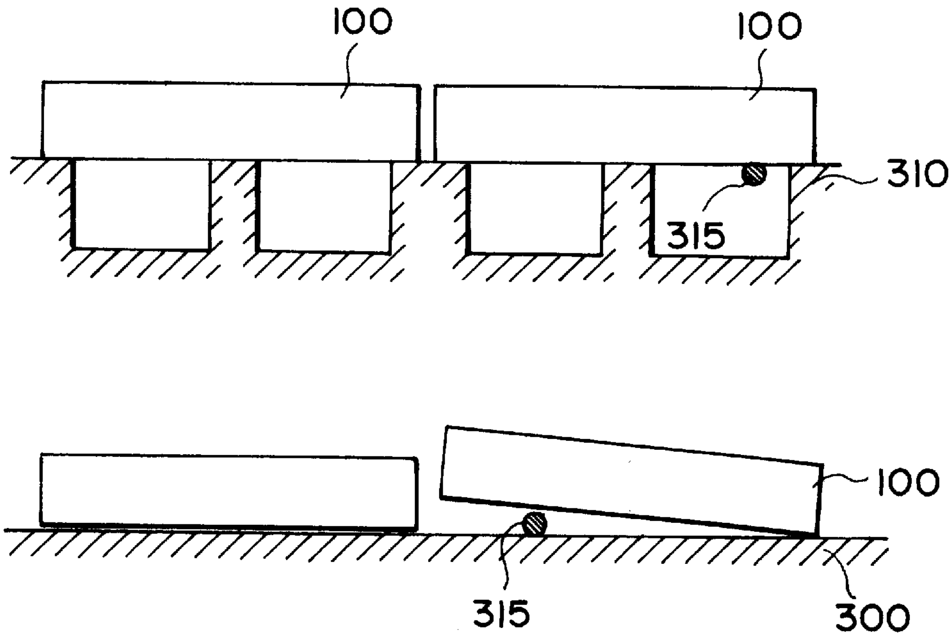
FIG. 2 is an illustration of step occurrence on a heater board by deposition of foreign matter.

The use of the seating in the ink jet head according to an embodiment of the present invention is effective to provide a solution to the problem of the step on the surface of the heater. The seating 310 is provided with recesses 311, and the HB100 is supported by the seating 310 at the portions of the seating 310 except for the recesses 311. The contact area between the seating 310 and the HB100 can be reduced by the recess 311.Even if foreign matter is deposited on the contacting surface of the HB100 or the base plate 300, most of the foreign matter 315 enters the recess 311, as shown in FIG. 2, and therefore, the probability of production of the step of surfaces of the heaters between adjacent HBs is remarkably reduced. Usually, the HB 100 and the seating 310 are connected by adhesive material. If the adhesive material is provided in the recess 311, the fixing therebetween is assured even if the quantity of the is adhesive material is not so strictly controlled.

Designated by 313 is a sucking opening for assuring the positioning of the HBs 100 on the seating 310 portion. The HBs 100 are attracted through the sucking openings 313 to the base plate 300 to be fixed on the base plate 300 so that the HBs 100 can be maintained with high positional accuracy until the adhesive material is cured.

The description will be made as to a method for mounting the HB to the base plate provided with the seating and a manufacturing method of the ink jet head.

Figure 3:
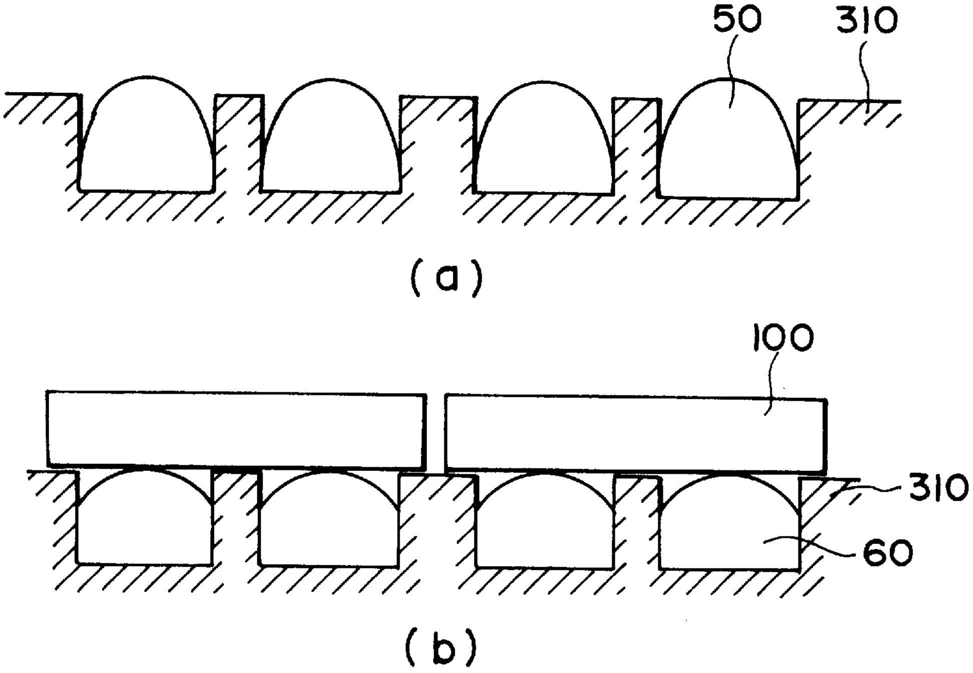
FIG. 3 is an illustration of introduction of surplus adhesive material in a groove of the seating.

First, a base plate 300 provided with an integral seating 310 shown in FIG. 1 is made from an aluminum substrate through a die-cast method. On the other hand, a plurality of HBs 100 having an electrothermal transducers on a silicon substrate made through a thin film formation technique, are prepared. Subsequently, proper amount of of the adhesive material is poured into the recess 311 of the seating 310. At this time, the adhesive material 50 in the recess 311 is bulged due to its viscosity or surface tension beyond the reference surface of the seating, as shown in FIG. 3, *a*. Then, the HB 100 is placed on the position where the adhesive material 50 has been dropped into the recesses thereof, and the HB 100 is attracted through the sucking opening 313 so that the HB 100 is temporarily fixed. At this time, the adhesive material 50 is attached to the HB 100, as shown in FIG. 3, *b*, and surplus adhesive material 50 enters the space in the recess. With this state, the adhesive material 50 is not completely cured, and therefore, the position of HB 100 can be corrected if the sucking is eased. When the position of the HB 100 is firmly determined, the adhesive material 50 is cured by heating or the like, thus fixing the HB 100. The step on the surface of the heater of the ink jet head of a full line type manufactured through such a method is as small as not more than +~_1 micron between adjacent HBs. Each HB 100 is electrically connected to the wiring substrate 400 by wire bonding, and thereafter, the top plate 200 extended to cover all the HBs 100, is mounted on the HBs 100. The top plate 200 is provided with grooves formed by ejection molding to constitute the ink flow paths and ejection outlet plate. By fixing the top plate 200, an ink jet head of full line type is completed.

When the printing operation is carried out actually using the ink jet head of this this embodiment, satisfactory print was provided over the entire width of the printing sheets.

The description will be made as to an ink jet device suitably usable with the ink jet head of this invention.

Figure 12:
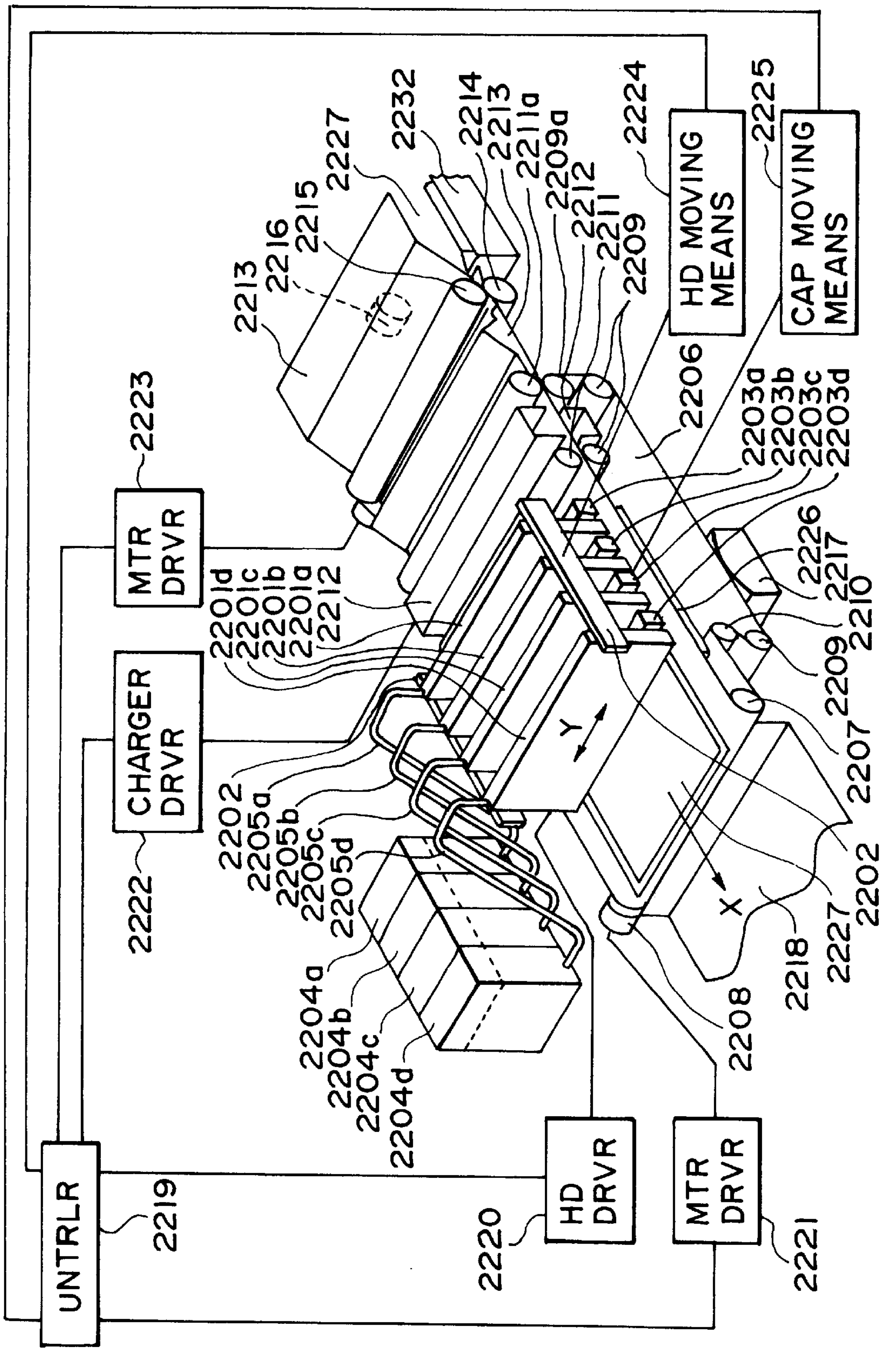
FIG. 12 shows an example of ink jet device having an ink jet head according to an an embodiment of the present invention.

FIG. 12 shows a construction of an ink jet device having the ink jet head according to the foregoing an embodiment.

The ink jet device is provided with line type heads 2201*a*–2201*d* as shown in FIG. 12, and the line type heads 2201*a*–2201*d* are fixed in parallel with each other at predetermined intervals in a X direction by a holder 2202. On the bottom surface of each head 2201*a*–2201*d*, 3456 ejection outlets are provided faced down at the intervals of 16 ejection outlets/mm in a line in Y direction to enable the recording over a width of 218 mm.

The heads 2201*a*–2201*d* eject recording liquid by thermal energy, and the ejection control is effected by a head driver 2220.

A head unit is constituted by the heads 2201*a*–2201*d* and the holder 202, and the head unit is movable up and down by a head moving means 224.

Below the heads 2201*a*–2201*d*, head caps 2203*a*–2203*d* are disposed adjacent to the respective heads 2201*a*–2201*d* corresondingly thereto. Each head cap 2203*a*–2203*d* is provided with an ink absorption member such as sponge therein.

The caps 2203*a*–2203*d* are fixed by unshown holder. A cap unit is constituted by the holder and the caps 2203*a*–2203*d*. The cap unit is movable in the X direction by the cap moving means 2225.

To the heads 2201*a*–2201*d*, cyan, magenta, yellow, black inks are supplied from ink containers 2204*a*–2204*d* through ink supply tubes 2205*a*–2205*d*, respectively to permit color recording.

For the ink supply, capillary phenomenon at the head ejection outlet is used, and therefore, the liquid surface of the each ink container 2204*a*–2204*d* is lower than the ejection outlet position by a constant distance.

This device has an electrically chargeable seamless belt 2206 for transporting a recording material in the form of a recording paper 227.

The belt 2206 is extended along a predetermined path by a driving roller 2207, idle rollers 2209, 2209*a* and a tension roller 2210, and is connected to the driving roller 2207. It is moved by a belt driving motor 2208 driven by a motor driver 2221.

The belt 2206 travels right below the ejection outlets of the heads 2201*a*–2201*d*. In this embodiment, the downward deflection is suppressed by the fixed supporting member 2226.

Designated by reference numeral 2217 is a cleaning unit for removing paper dust or the like deposition on the surface of the belt 2206.

Designated by reference numeral 2212 is a charger for charging the charger, and the charger 2212 is rendered ON and OFF by a charger driver 2222, the recording paper is attracted on the belt 2206 by the electrostatic attraction force produced by the charging.

Before and after the charger 2212, there are provided pinch rollers 2211 and 2211*a* for cooperation with the idle rollers 2209 and 2209*a* to urge the transported recording paper 2227 to the belt 2206.

Designated by reference numeral 2232 is a sheet feeding cassette, a recording paper 2227 in which is fed out one by one by the rotation of the sheet feeding roller 2216 driven by the motor driver 2223, and is fed in the X direction to a wedge-shaped guide 2213 by a transportation roller 2214 and a pinch roller 2215 driven by the same driver 2223. The guide 2213 has a wedge-shaped space to permit deflection of the recording paper.

Designated by reference numeral 2218 is a sheet discharge tray for receiving the recording paper on which the printing has been completed.

The control circuit 2219 controls all of the head driver 2220, head moving means 2224, cap moving means 2225, motor driver 2221, 2223, and charger driver 2222.

Embodiment 2

Figure 4:
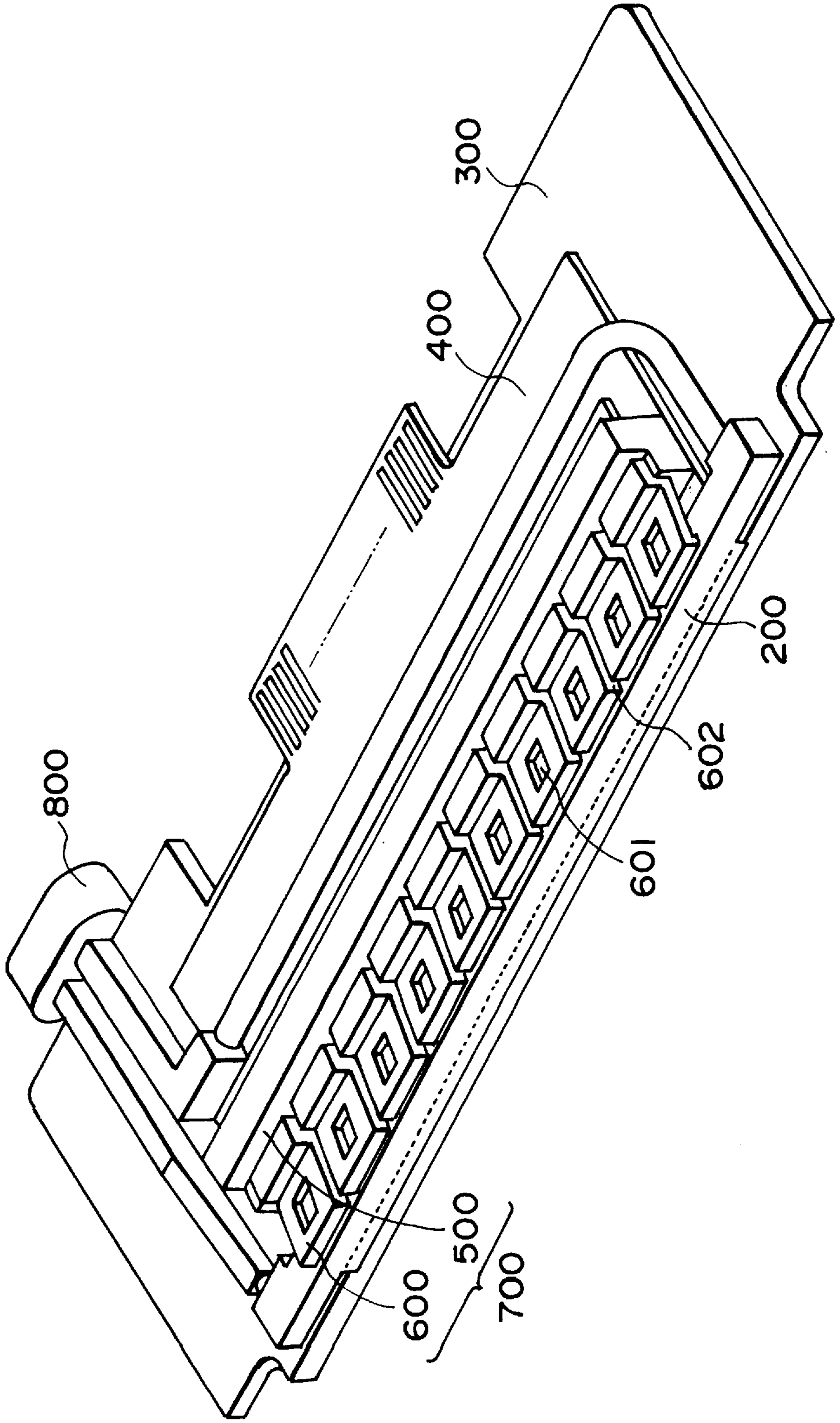
FIG. 4 is a schematic exploded view of an ink jet head according to a second embodiment of present invention.
Figure 5:
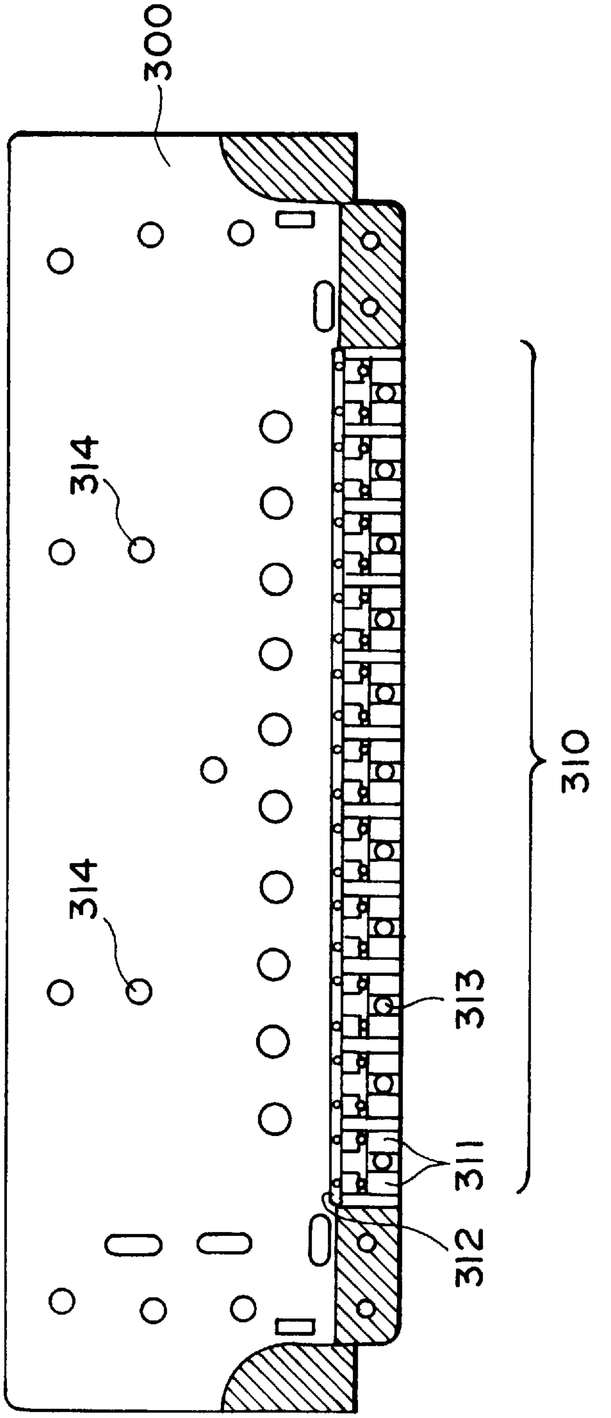
FIG. 5 is a schematic view of a base plate used in the second embodiment.
Figure 6:
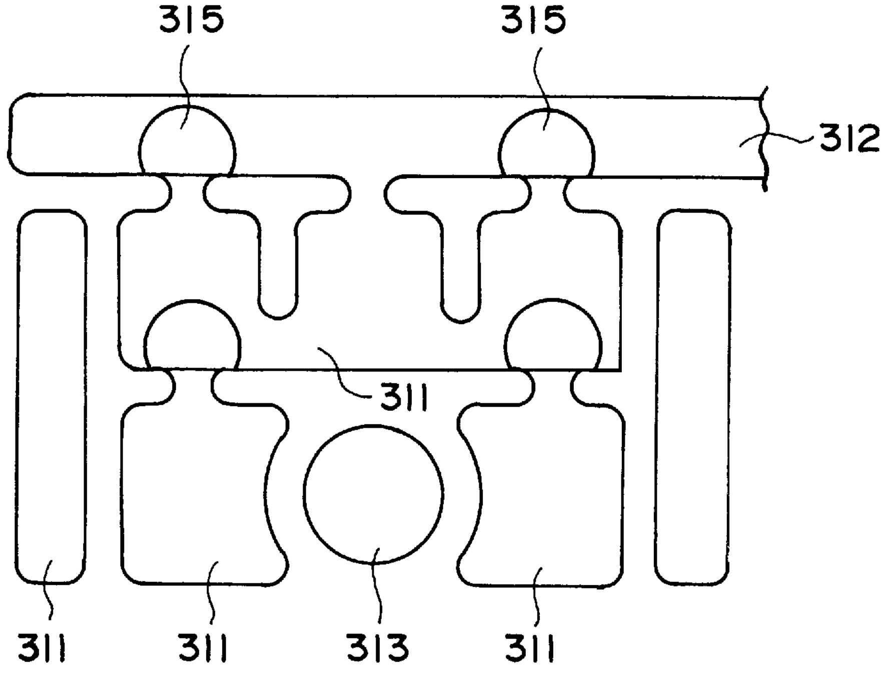
FIG. 6 is an enlarged view of the seating portion of FIG. 5.

FIG. 4 is a schematic perspective view of an ink jet head according to a second embodiment of the present invention. FIG. 5 is a schematic view of a base plate of this embodiment, and FIG. 6 is an enlarged view of the seating portion of FIG. 5.

The second embodiment of the present invention will be described with a manufacturing step of the ink jet head.

Figure 7:
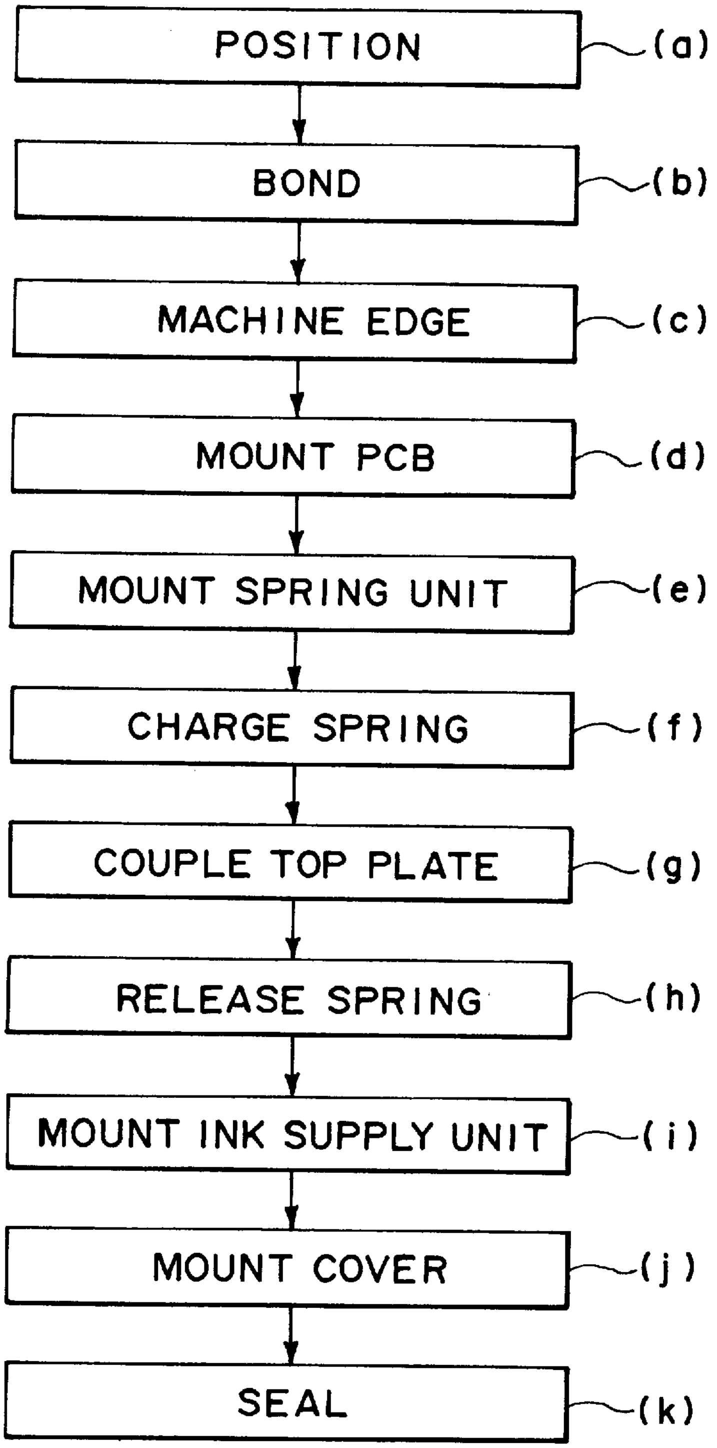
FIG. 7 is an illustration of manufacturing step of the ink jet head according to the second embodiment.

FIG. 7 is an illustration of manufacturing step of the ink jet head in this embodiment. In this embodiment, a long multi-head using one grooved top plate for 11 heater boards (HBs), are used. The manufacturing method thereof will be described.

First, a base plate having projections for PCB positioning and HB supporting portions for supporting the HBs, is formed from an aluminum substrate through a die-cast molding. The supporting portion is provided with openings for attracting the HBs to fix them temporarily to the recess for the adhesive material injection. FIG. 5 is a schematic view of a base plate produced through the die-cast molding, and FIG. 6 is an enlarged view of the seating portion of FIG. 5. In FIGS. 5 and 6, designated by 310 is a HB supporting portion, and 311 is a recess in the HB supporting portion, 312 is an adhesive material injection groove in communication with the recess 311, 313 is a sucking opening, 314 is a positioning projection of the PCB, and 315 is a dimple for communication between the adhesive material injection groove 312 and the recess 311.

The hatched portion of the base plate and the surface of the supporting portion are abraded or ground. By this, the flatness of the surface of the supporting portion is improved to decrease the probability of occurrences of the step when the HBs are positioned. The opposite end portions of the base plate function as the positioning portion relative to the device to improve the accuracy in the assemblying.

While the base plate is manufactured, a plurality of heater boards (HBs) each having electrothermal transducer elements manufactured through the thin film formation technique on a silicon substrate, are prepared.

Then, the HBs thus prepared, are arranged and correctly positioned on the HB supporting portion of the base plate using positioning tool or the like. The HBs thus positioned are fixed temporarily by attraction through the sucking opening by a vacuum tool disposed below the base plate. In this manner each HB is sequentially disposed on the base plate.

Step a

Then, the adhesive material is poured through the adhesive material injection groove in the base plate. The adhesive material enters the dimple which is in communication with each recess and the adhesive material injection groove, and it enters each recess by the capillary phenomenon. By the provision of the dimple at a position for communicatin between the adhesive material injection groove and the each recess, the adhesive material is accumulated in the dimple so that the adhesive material smoothly flows into each recess. Thereafter, the adhesive material is spontaneously dried, and the HB is completely fixed. Then, the sucking by the vacuum tool is released. If a firmer fixed is desired, the adhesive material may be injected through the sucking opening.

Step b

After the completion of the position and fixing of the HB, the base plate and the HB are subjected to grinding to remove step in the HB at the lateral end of the ejection outlet. This is done, because if a step is formed in this portion, cross-talk occurs since the top plate which will be described hereinafter is abutted to the ejection outlet lateral edge.

Step c

Then, the PCB(wiring substrate) is bonded to the base plate with positioning using the positioning projections. By doing so, the predetermined positional relation is established, wherein the electrode pads on the PCB and the electrode pads on the HB correspond respectively. By wire bonding between the electrode pads on the PCB and the electrode pads of the HB, the HB and the PCB are electrically connected. Contemporaneously, the conduction check for the wire bonding is carried out.

Step d

Subsequently, a press-contact unit is mounted for the purpose of close contact of the top plate on the HB on the base plate. The press-contact unit comprises a leaf spring member for urging the heater board and a leaf spring member for supporting and fixing the leaf spring member. The leaf spring member has a plurality of cut-away portion, and is divided into a plurality of urging portions. Each urging portion is provided with a through-opening, into which a jig is inserted to effect regulation and release of the urging force for each urging portion.

When the press-contact unit is fixed to the BP, the fixed member is joining with the BP through the PCB, and is fixed by screw or heat crimp or the like.

Step e

In order to fix the top plate on the heater board, the urging force of each urging portion is regulated by the jig.

Step f

After sufficient space is provided on the heater board in this manner, the alignment is effected so that the ink flow paths and the ejection energy generating elements correspond to each other, and the top plate is joined to the HB.

Step g

Then, the urging force of the urging portion is released, thus fixing the top plate. The release of the urging force of the urging portion (the fixing by the urging portion) is effected from the center portion urging portion toward the opposite ends sequentially. By releasing the urging force in this manner, the warpage of the top plate can be controlled to permit outward escape of the deflection so that the satisfactory joining state can be assured over the entire HB. After the release of the urging force of the urging portion, the jig is all removed from the main assembly of the head.

Step h

An ink supply unit is then fixed to a position of the base plate at each end by welding or the like. The ink is supplied to the top plate by the ink supply unit. The ink may be supplied in the opposite directions, or may be supplied in one direction to circulate the ink. A filter is provided at the connector portion of the ink supply unit to trap bubbles.

Step i

Finally, a head cover is mounted so as to cover the base plate, and a sealant is supplied to the top plate joining portion and wire bonding portion through a window formed at a position of the head cover corresponding to the urging portion. Thus, the ink jet head is completed.

Step j

Figure 8:
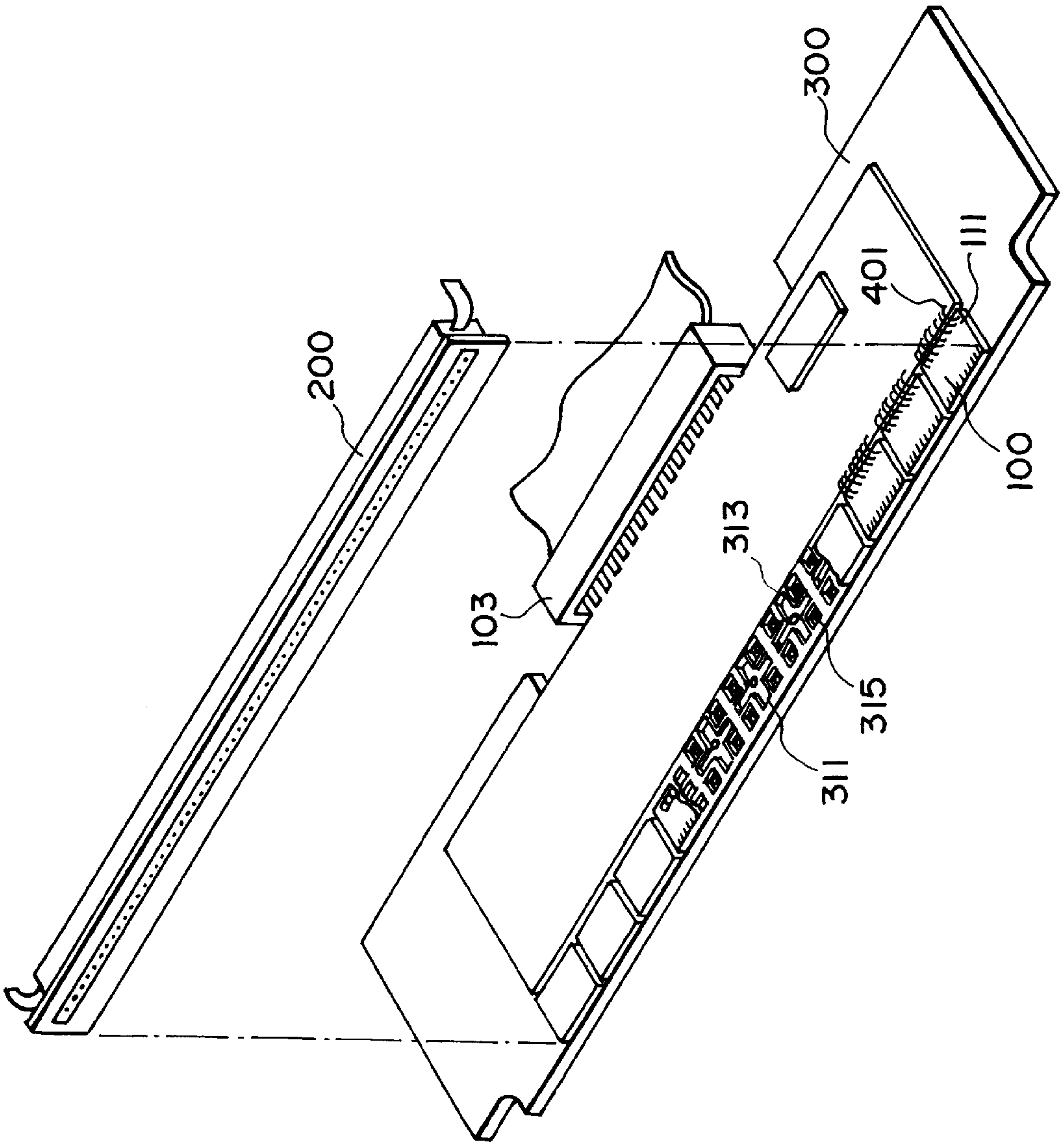
FIG. 8 is a schematic view of an ink jet head having a through-opening in the base plate functioning as an adhesive material injection portion in FIG. 5 embodiment.

In this embodiment, the adhesive material injection portion is in the form of a groove at the HB position side of the base plate, but it may be a through-opening through the base plate, as shown in FIG. 8.

Similarly to embodiment 1, the ink jet head could effect satisfactory printing over the all area of the width of recording sheet.

Embodiment 3

Figure 9:
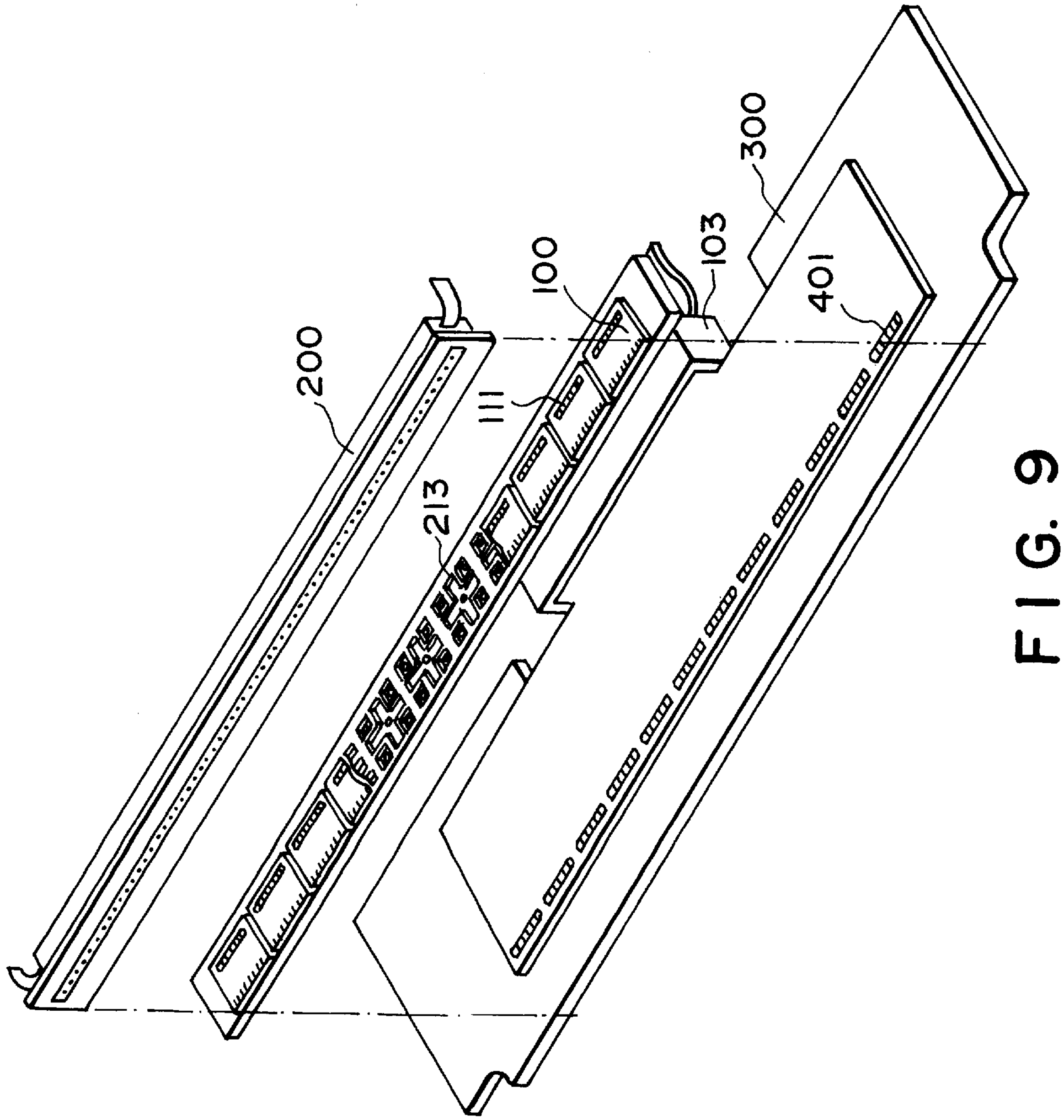
FIG. 9 is a schematic exploded view of an ink jet head according to a third embodiment of the present invention. Shows a FIG. 10 example of a conventional positioning method when the heater boards are positioned on the base plate.

FIG. 9 is a schematic exploded view of an ink jet head according to a third embodiment of the present invention.

In FIG. 9, seating 3 functioning as a supporting member for HB position is a member separate from the base plate 2. By the use of the separate seating 3 and base plate 2, the material suitable for high processing accuracy at the reference surface of the seating can be used for the seating, so that the material and processing method appropriate for the respective members are usable. Additionally, even if the processing accuracy of the base plate is poor to a certain extent, the accuracy of the step on the surface of the heater in the heater board is not influenced, and therefore, the cost for the manufacturing of the base plate can be saved, thus permitting cost reduction.

When the seating is formed on the base plate, the manufacturing method of the ink jet head is such that a member constituting the seating is set on a HB arrangement machine, and each HB is bonded to the seating, and thereafter, the seating 3 is fixed on the base plate 2. By first mounting the HB to the seating, the necessity of the provision of the through-opening in the base plate is eliminated. The joining between the seating 3 and the base plate 2 may be effected using any means such as an adhesive material or mechanical means unless the positional accuracy of the HB on the seating is not disturbed. As the subsequent steps, they are the same as embodiment 1 or 2.

Embodiment 4

A fourth embodiment will be described.

Figure 16:
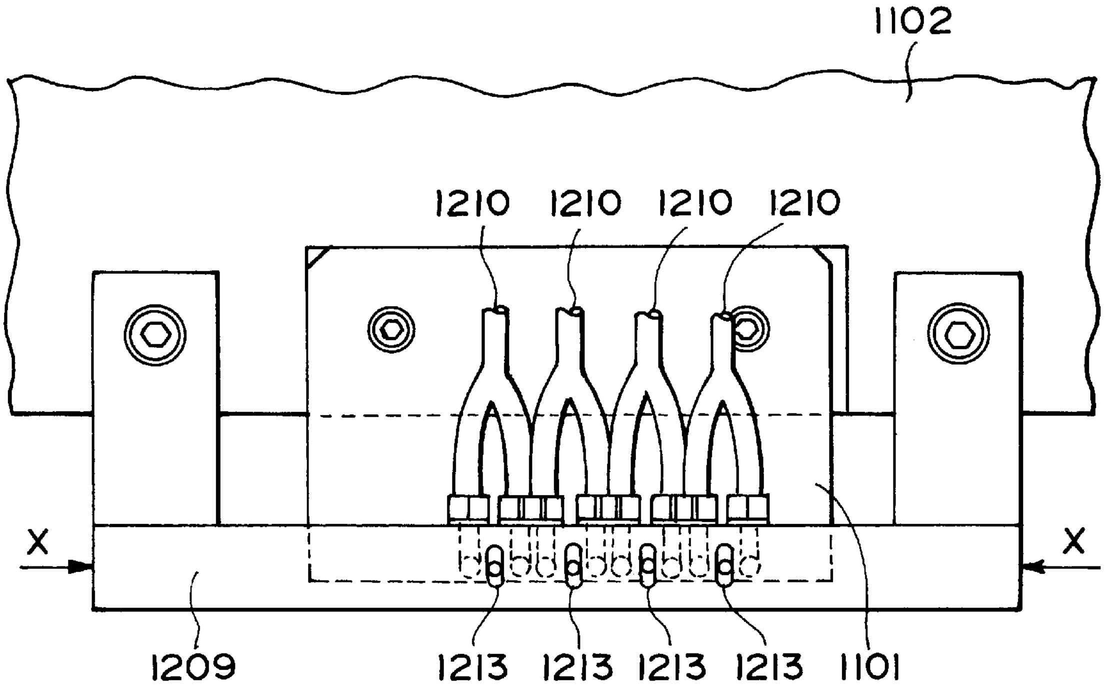
FIG. 16 is a sectional view and a sectional view of the neighborhood of the base plate in the device of FIG. 13.
Figure 16:
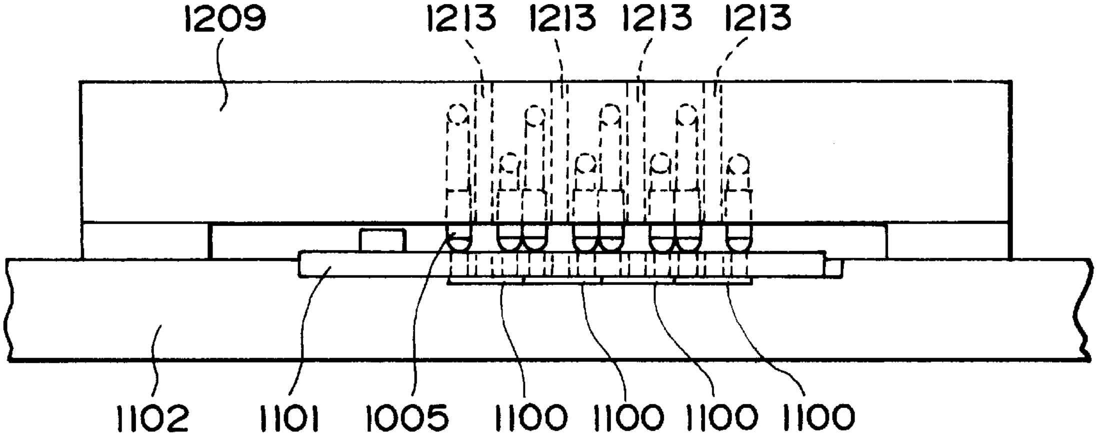

FIG. 16 is a top plan view (a) and front view (b) of a device using a first bonding method.

In FIG. 16, designated by 1102 is a heater board/base plate supporting portion, on which an attraction portion 1209 for positioning the heater board 1100 on the base plate 1101 is fixed by screws. The base plate 1101 is fixed such that a reference surface for mounting the heater board 1100 mounting faces down in the vertical direction. Therefore, the heater board 1100 is fixed to the base plate from the bottom.

To the attraction portion 1209, pairs of air introduction portions 1210 are connected. A heater board transported by fingers is attracted to the bottom surface of the base plate by attraction or sucking air produced by a vacuum generator (unshown). The attraction portion 1209 is provided with a plurality of openings 1213 for permitting application of a photo-curing adhesive material and for transmitting the light for photo-curing of the bonding material. The shape of the opening 1213 may be a simple circular hole. However, in this embodiment, it is in the form of an elongated hole to permit transmission of a larger quantity of light for the photo-curing.

The reason for the orientation of the base plate 1101 to provide the downward facing of the mounting reference surface of the heater board 1100 is that when the adhesive material for fixing the base plate to the heater board is applied by a dispenser, the adhesive material is easily ejected from the dispenser in the vertical direction, and the adhesive material is sufficiently expanded in the adhesive material injection opening 213 formed in the base plate.

Figure 17:
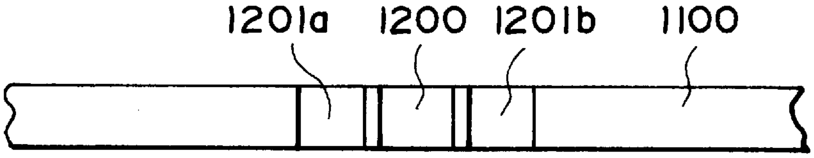
FIG. 17 is a sectional view of the base plate of embodiment 4.
Figure 23:
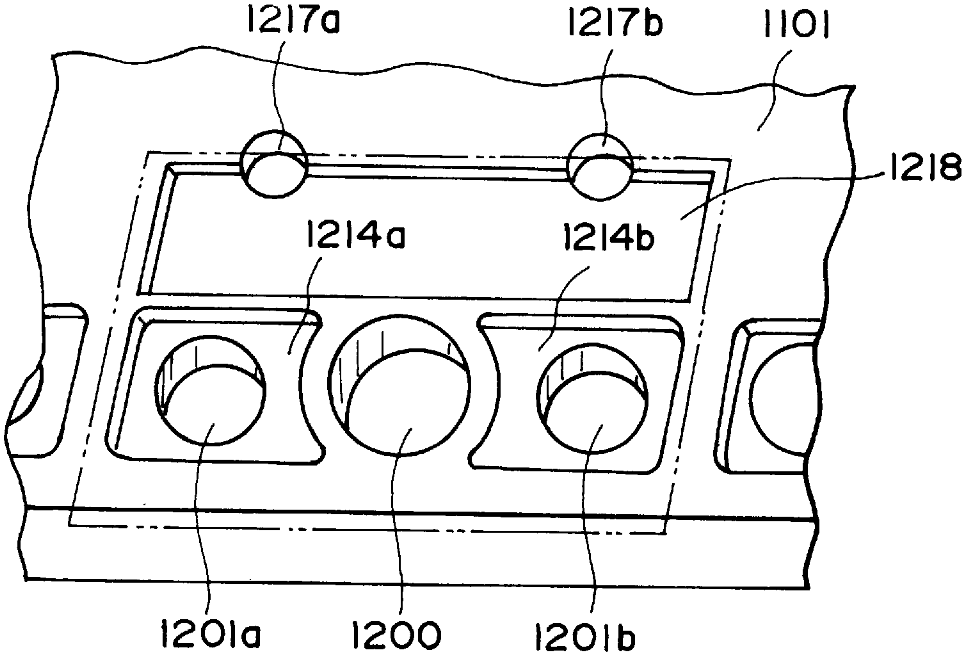
FIG. 23 is an enlarged perspective view showing a reference surface for heater board mounting on the base plate.

Referring to FIGS. 17 and 23, the description will be made as to the details of the base plate of this embodiment. FIG. 23 is an enlarged schematic view of the base plate reference surface for the heater board mounting. FIG. 17 is a sectional view adjacent the heater board mounting portion of the base plate.

The base plate 1101 is provided, as shown in FIG. 23, with a pair of heater board attraction opening 1201 1201*a* and 1201*b* at a front portion of the reference surface (ejection outlet side), and a first adhesive material application opening 1200. The number of the heater board attraction openings 1201 and the number of the first adhesive material application openings 1200 are the same as the number of the heater boards mounted on the base plate. In order to improve the attraction force for the heater board, the heater board attraction opening 1201 of the base plate is in communicatin with attraction grooves 1214*a* and 1214*b* formed in the reference surface for the heater board mounting to increase the attraction area. In this embodiment, the pair of the heater board attraction openings 1201 are symmetrically arranged. This is effective to avoid movement of the heater board during the second adhesive material curing to enhance the bonded state. Only one of them may be employed when the accuracy may be slightly poor.

Here, the first adhesive material application opening 1200 is provided adjacent the center of gravity of the heater board. This is because the first adhesive material is for the temporary fixing of the heater board. With the first adhesive material alone, sufficient bonding strength is not assured, and therefore, the opening diameter may be small as long as the minimum bonding strength for fixing the heater board until the second adhesive material application process is provided. In order to fix the heater board with the minimum bonding strength, the first adhesive material application opening 1200 is adjacent the center of gravity of the heater board. The heater board attraction reference surface (mounting reference surface) is finished to a smooth surface by abrasion or the like, to prevent reduction of the attraction force by leakage upon attraction of the heater board and to prevent the applied adhesive material from being sucked into the attraction opening.

The reference surface for the heater board mounting at the backside of the reference surface for the heater board mounting is provided with a second adhesive material filling groove 1218, and a part thereof has second adhesive material injection groove 1217*a* and 1217*b*.

Figure 18:
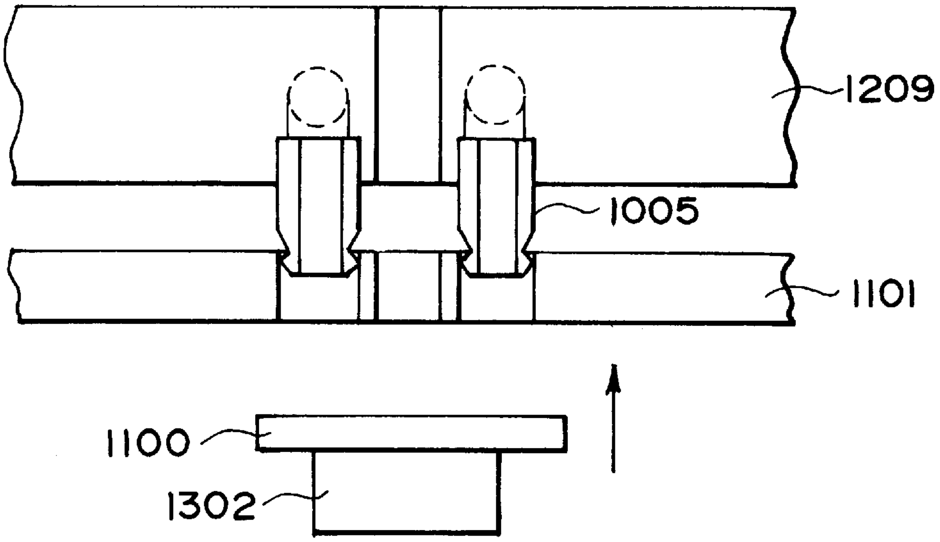
FIG. 18 is an illustration of operation of arrangement in the heater boards on the base plate in FIG. 17.

Referring to FIG. 18, the description will be made as to a portion for attracting the heater board to the base plate.

In FIG. 18, the heater board 1100 is being placed by fingers on the base plate 1101 fixed to the heater board/base plate supporting portion 1102.

The finger 1302 are effective to hold the heater board by attraction. By the attraction of the heater formation surface of the heater board, the liability of the fingers contacting to the heater board already positioned, upon the heater board mounting, is avoided, thus improving the yield. A rubber pad 1005 is used at the attraction air supply connection portion with the base plate to prevent leakage.

Figure 13:
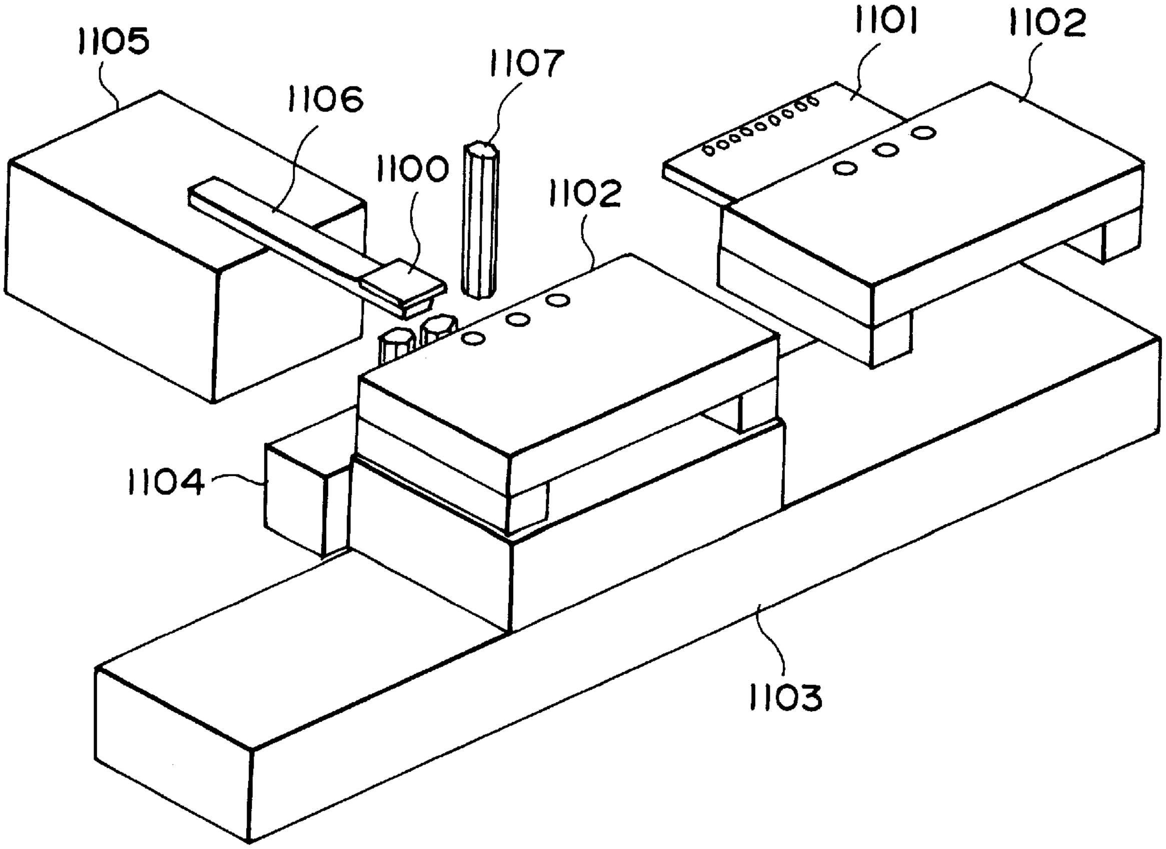
FIG. 13 is a schematic view wherein heater boards are placed on the base plate in an ink jet head according to embodiment 4 of the present invention.
Figure 14:
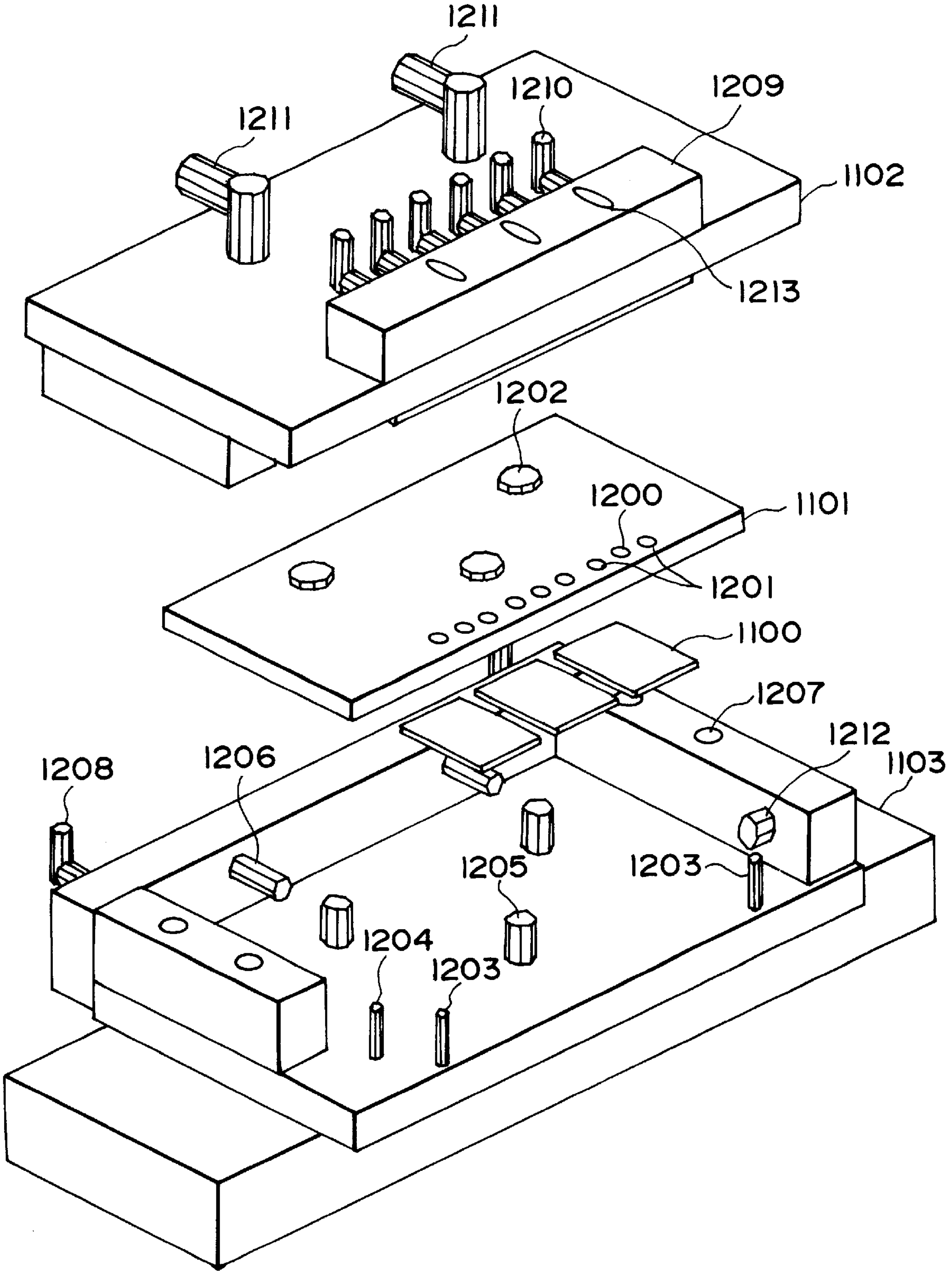
FIG. 14 is a schematic view showing major portions in FIG. 13.
Figure 15:
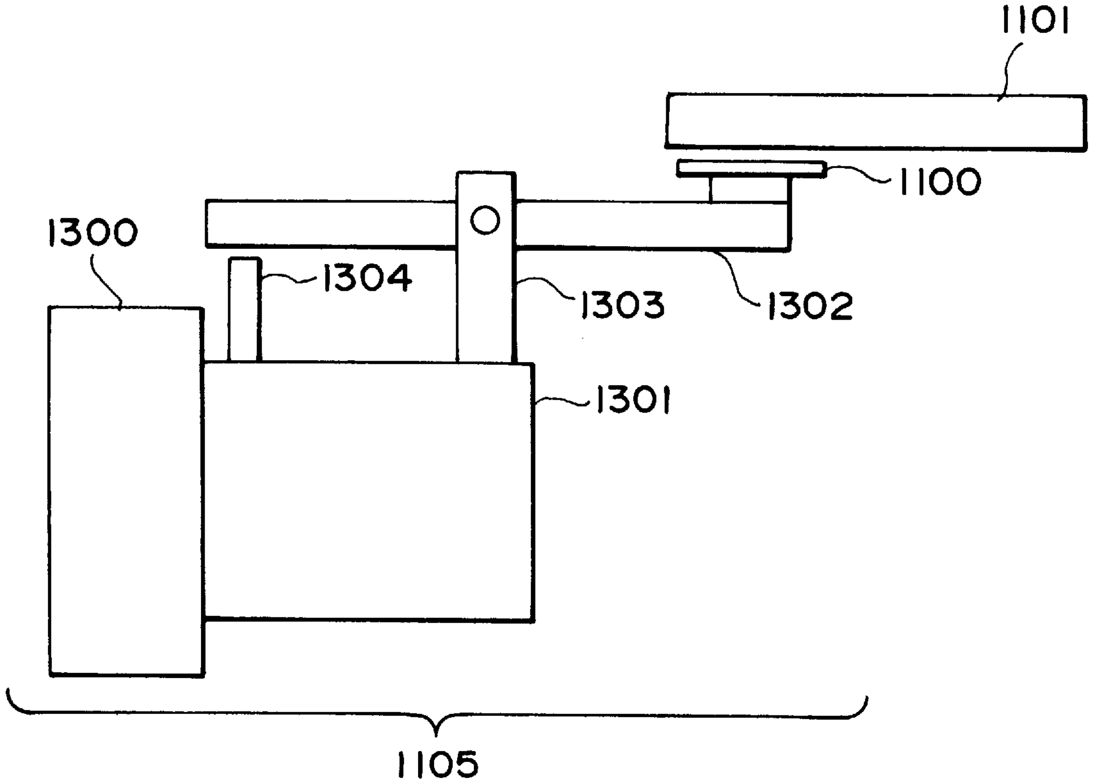
FIG. 15 is a schematic view showing detail of heater board position pose change portion of FIG. 13.

Referring to FIGS. 13–15, the description will be made as to, operation when the heater boards are positioned and fixed to the base plate.

In FIG. 13, the heater board 1100 is supplied from a heater board supply portion (unshown) to a heater board grip portion 1106, and is transported to a heater board position measurement portion 1104 while the heater board 1100 is kept on the heater board grip portion 1106. In the heater board position measurement portion 1104, a heater board position/pose change portion 1105 for supporting the heater board grip portion 1106 is moved to provide a predetermined position and pose of the heater board 1100.

On the other hand, the base plate 1101 is supplied from a base plate supply portion (unshown) to a heater board/base plate supporting portion 1102 and is attracted by air sucking by negative pressure air introduction portion 1211. The heater board/base plate supporting portion 1102 attracting the base plate 1101, is moved to a base plate positioning and transporting portion 1103. At this time, the base plate 1101 is abutted to abutments 1203 and 1204, and is fixed by references 1206 and 1212 in the vertical direction, a vertical abutment reference 1202 of the base plate 1101 is pushed up and abutted to the heater board/base plate supporting portion by a fixed portion 1205 for vertical base plate positioning. Thus, the base plate 1101 is abutted to the reference of the base plate positioning and transporting portion 1103 so that it is cramped at the correct position. Thus, the correct positioning is accomplished irrespective of the positional accuracy of the plurality of heater board/base plate supporting portion. So, the heater board 1100 in the arrangement position positioning by the heater board position/pose change portion 1105 with a pose, is adjusted only to the abutting reference of the base plate positioning and transporting portion 1103 having only one positioning reference.

The base plate positioning and transporting portion 1103 carrying the heater board/base plate supporting portion 1102 is moved to a predetermined position in the direction of the arrangement to carry the first heater board. With this state, the heater board position pose change portion 1105 gripping the heater board 1100 with the corrected pose and position, lands on the heater board 1100 on the base plate 1101. At this time, the landing of the heater board 1100 is detected, and the vertical direction position upon the landing is detected.

FIG. 15 is a schematic view of a landing portion to the base plate 1101.

In FIG. 15, designated by 1302 is a finger for griping the heater board 1100; 1303 is a support column connected by a rotational shaft to rotate the finger 1302 by the contact between the heater board 1100 and the base plate 1101; 1304 is a contact detection sensor for detecting the finger 1302 rotating by the contact between the heater board 1100 and the base plate 1101. The finger 1302, support column 1303 and contact detection sensor 1304 are carried on a movement portion 1301 for moving the heater board 1100 in the vertical direction (heater board/base plate contact direction).

The description will be made as to the joining operation-of the heater board 1100 to the base plate 1101.

The heater board 1100 moved to a predetermined position and pose by the heater board position/pose change portion 1105 is disposed beforehand at a position not contacting to the base plate 1101 in the vertical direction. After the pose and position are determined, the heater board 1100 is moved by pose and position the vertical direction driver 1300 in the vertical direction. When the heater board 1100 and the base plate 1101 are contacted, the finger 1302 rotates about the support column 1303, and the landing is detected by the contact detection sensor 1304. The vertical direction movement position at this time is stored, and the stored data is compared with the data upon the next landing of the heater board 1100, and if the difference is larger than a predetermined level, improperness is discriminated. The heater board 1100 landed on the base plate 1101 is supported on the base plate 1101 by the negative pressure air supplied from the outside through the heater board attraction opening 1201 of the base plate, attraction portion 1209 of the heater board/base plate supporting portion 1102, and a portion of the outside negative pressure air introduction portion 1210 for the first heater board attraction.

After the heater board is thus supported, the adhesive material is supplied from dispenser 1107 as the adhesive material filling portion through the adhesive material filling hole 1213 of the heater board/base plate supporting portion 1102 and the adhesive material application opening 1200 of the base plate 1101 to prepare for the bonding between the heater board 1100 and the base plate 1101.

Figure 19:
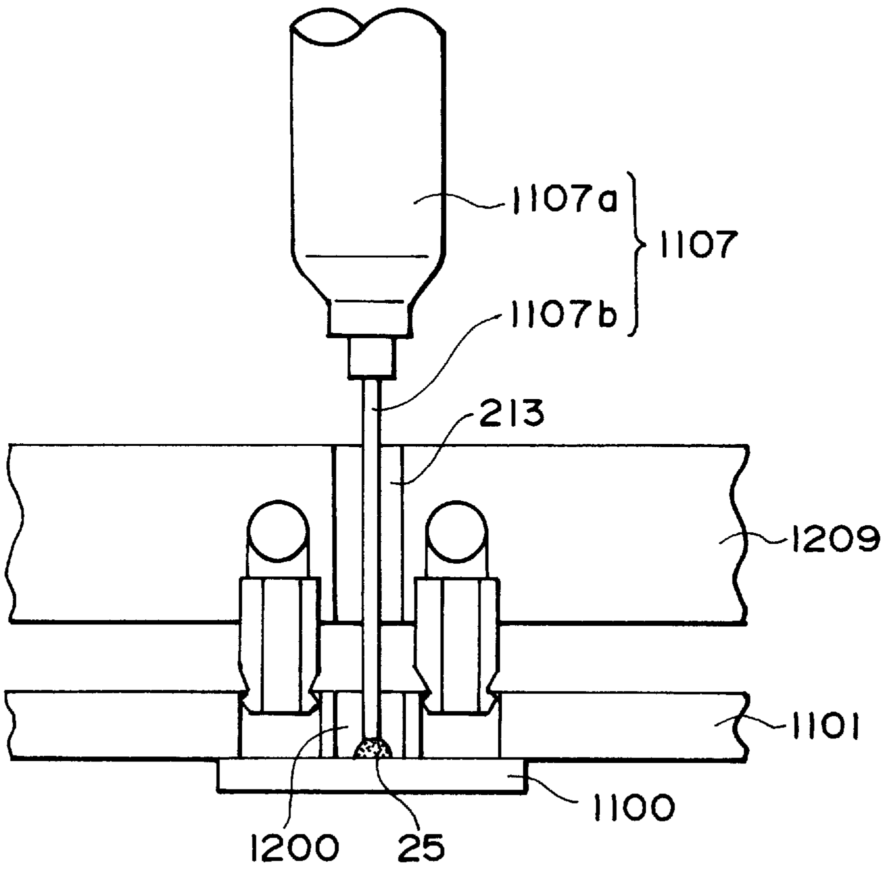
FIG. 19 is an illustration of operation of supplying an adhesive material into the opening of the base plate in FIG. 17.

FIG. 19 shows the adhesive material filling, wherein designated by 1107*a* is a cylinder containing the adhesive material; 1107*b* is a needle at the end of the dispenser 1107. The needle of the dispenser 1107 is inserted into the adhesive material filling hole 1213 of the attraction portion 1209 and the adhesive material application opening 1200 of base plate 1101, and the first adhesive material is ejected adjacent the center portion of the opening when the tip end of the needle is at 0.5 mm approx. away from the heater board.

Subsequently, in order to position and fix the second heater board 1100, the heater board supporting portion 1106 receives a heater board 1100 from the heater board supply portion (not shown). The base plate positioning and transporting portion 1103 moves to a position for positioning and fixing the second heater board 1100, while supporting the first heater board 1100 on the base plate 1101 by the negative pressure air. Similarly to the first heater board, the second heater board is placed, positioned and supported. In this manner, the attraction of the heater board and the adhesive material filling is repeated for the predetermined a number of times equal to the number of the heater boards on the single base plate.

The base plate now carrying the predetermined a number of of heater boards positioned, attracted with the adhesive material supplied is transported to a discharging position by the base plate positioning and transporting portion or means 1103 together with the heater board/base plate supporting portion 1102, and is exposed to the light for the curing of the bonding material by a transporting means (not shown).

Figure 20:
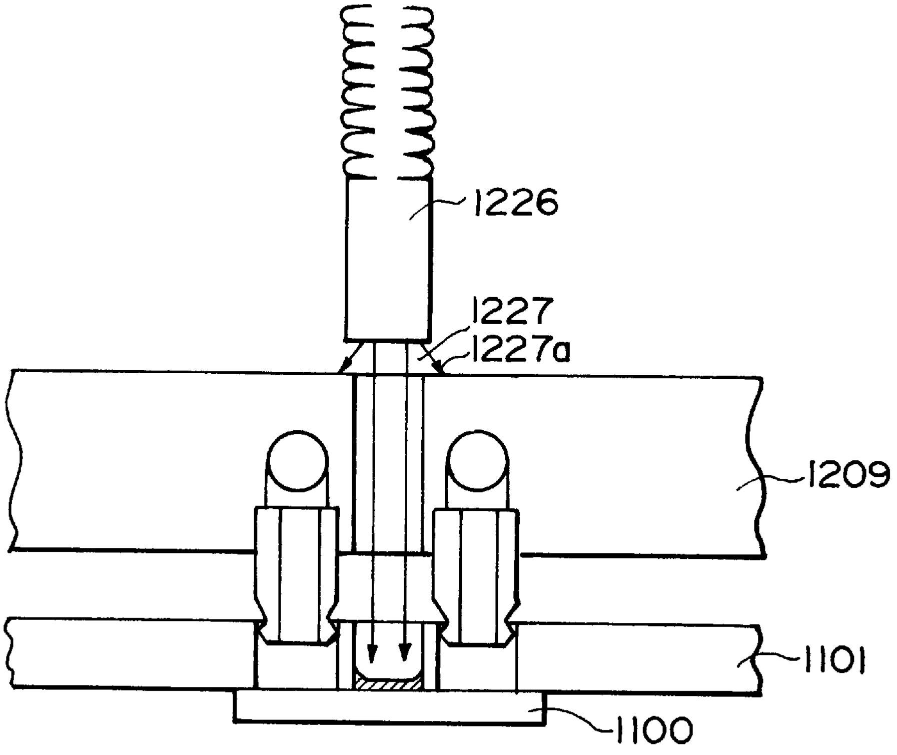
FIG. 20 is an illustration of light projection for curing the adhesive material in FIG. 19.
Figure 21:
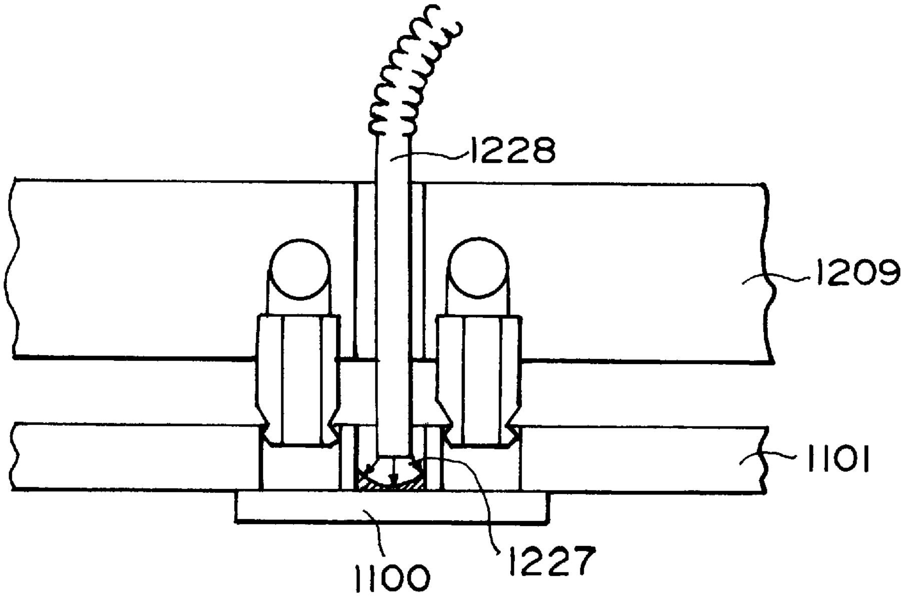
FIG. 21 is an illustration of light projection for curing the adhesive material in FIG. 19.

Referring to FIGS. 20 and 21, the exposure will be described. After the dispenser 1107 is retracted, the photo-curing adhesive material is exposed to ultraviolet radiation 1227 through the opening 1213 by a light projecting device set to the opening 1213. When a fiber diameter is large, as shown in FIG. 20, a part of the beams 1227*a* is cut by the attraction portion 1209. In view of this, at the portion for holding the fibers 1226, a fine adjustment mechanism is provided so as to provide a maximum illuminance. If the fiber diameter is small as shown in FIG. 12, the fiber 1228 may be inserted into the opening 1213 of the attraction portion 1209. At this time, the fiber 1228 may be moved vertically, or the base plate side may be moved vertically.

Figure 22:
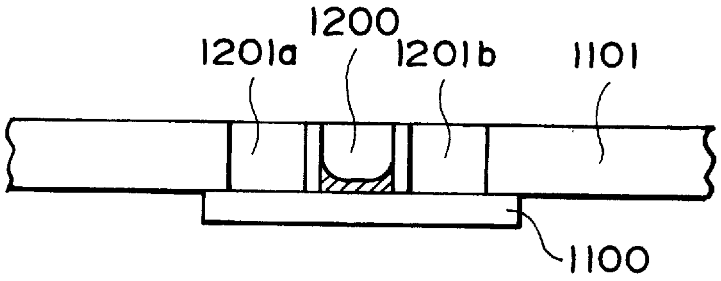
FIG. 22 is a schematic view showing a state wherein a heater board is temporarily fixed on the base plate of FIG. 17.

In this manner, the heater board and the base plate are temporarily bonded with each other by the adhesive material curing (FIG. 22). When the heater board and the base plate are fixed by the temporary bonding, the attraction between the heater board and the base plate by the negative pressure is released, and the base plate is removed from the heater board/base plate supporting portion. Then, it is fed to a permanent adhesive material filling portion (not shown) for the permanent bonding where the second adhesive material is supplied cured.

By the provision of a plurality of heater board/base plate supporting portions, the following advantage is provided. During the heater board being positioned, attracted and the temporary adhesive material filling being effected, another heater board/base plate supporting portion is operated to discharging the base plate having finished the photo-curing of the temporary adhesive material and the temporary bonding by the heater board/base plate supporting portion 1102, and to supply another base plate from the base plate supply portion for the next processing.

In this embodiment, the curing process of the temporary adhesive material is carried out, after the temporary adhesive material filling steps for all heater boards are completed, in the photo-curing process portion at a different position. However, it is a possible alternative that the photo-curing for the first heater board is carried out while the second heater board is positioned, after the positioning, attraction and temporary bonding material supplied, are carried out for the first heater board.

The description will be made as to supply and curing of the second adhesive material.

Figure 24:
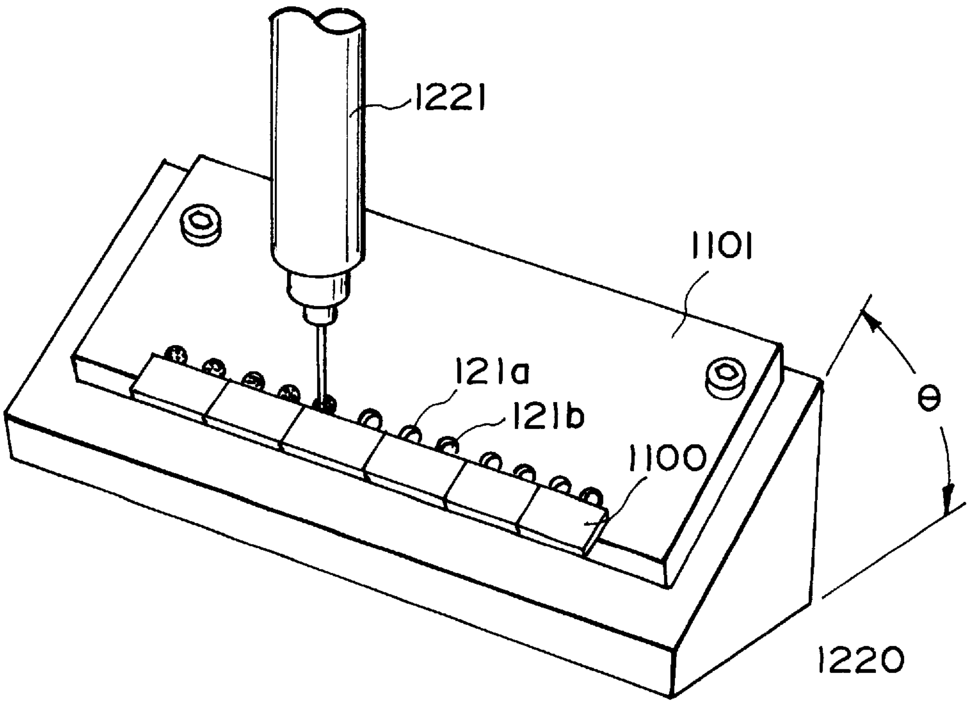
FIG. 24 is an illustration of operation of applying second adhesive material.

FIG. 24 illustrates application of the second adhesive material and the base plate fixed on a second heater board/base plate supporting portion 1220 to apply the second adhesive material.

The base plate 1101 is reverted, and it is supported on the heater board/base plate supporting portion 220 at the reference position with heater board 1100 at the top. The supporting method may be any, for example, screw fixing, finger clamping or the like is usable.

The second heater board/base plate supporting portion 1220 is inclined at a proper angle θ to facilitate supply of the adhesive material into the second adhesive material filling groove 1218 formed between the base plate and the heater board. By this angle of the base plate 1101, the second adhesive material flows into the adhesive material filling groove against the surface tension adjacent the adhesive material injection groove 1218 by the gravity. If the angle θ is too large (approaching to 90°), the second dispenser 1221 and the base plate are interfered. If it is too small (approaching 0°), it becomes difficult for the second adhesive material to overcome the surface tension. For these reasons, the angle is preferably 30°–60° approx.

The second adhesive material (spontaneous curing type or heat curing type) is supplied to the injection grooves 1217*a* and 1217*b* in the base plate by the second dispenser 1221. The second adhesive material is then flows into the second adhesive material filling groove 1218 between the base plate and the heater board by the gravity. Since the height of the second adhesive material filling groove 1218 is very small, the capillary phenomenon facilitate the flow.

The second adhesive material is received by the second adhesive material filling groove 1218 in approx. 10 sec after the supply. Thereafter, it flows by the capillary phenomenon, and therefore, the base plate may be made horizontal. It is removed from the second heater board/base plate supporting portion 1220 to permit spontaneous curing. By injecting the second adhesive material into the heater board attraction opening 1201, the bonding of the heater board is further assured.

Through the above-described steps, the positioning of the heater boards and fixing thereof are completed.

In this embodiment, different heater board/base plate supporting portions 1220 are used for the first and second bonding processes. However, if the heater board/base plate supporting portion 1220 is driven by NC or the like, for example, to restore the horizontal position after the completion of the first process, by which all the process are automated.

As described in the foregoing, in this embodiment, the temporary bonding is carried out with the heater board is attracted. Therefore, there is no need of keeping the base plate on the jig until the adhesive material is cured, and therefore, the manufacturing at the time of between can be reduced significantly.

Embodiment 5

When an elongated ink jet head is manufactured by arranging a plurality of heater board, the positioning accuracy of the heater boards is influential to the printing property, and therefore, very high positioning accuracy is required. The positioning accuracy here includes the accuracy in the step on the heater surface, the accuracies in ejection side end surface of the heater board and the intervals such as center pitch between heater boards. In this embodiment, in order to enhance the positioning or arrangement accuracy of the heater boards, the positions of the heaters and the positions of the ejection outlet end surfaces are measured through non-contact method before the heater board is positioned. Among non-contact methods, image processing is used.

The image processing method will be described.

The steps of the image processing method are as follows.

(1) transporting the heater board to an image processing area.

(2) confirming the center heater of the heater board by the image processing.

(3) calculating an inclination of the heater board simultaneously with (2).

(4) confirming the ejection side end surfaces of the heater board by the image processing.

(5) making correction on the basis of the data obtained through steps (2)–(3), and placing the heater board on the seating with alignment of the center pitch and the heater board ejection side end surface.

By the use of the image processing, the arrangement accuracy on the seating is not more than ±2 microns.

Figure 10:
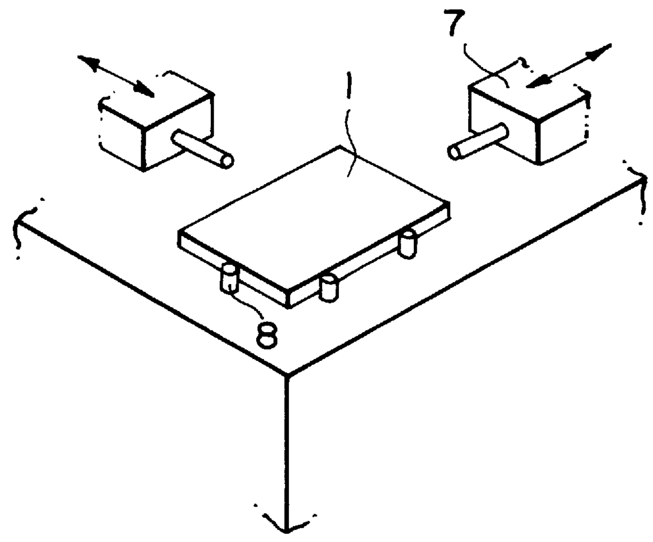
Figure 11:
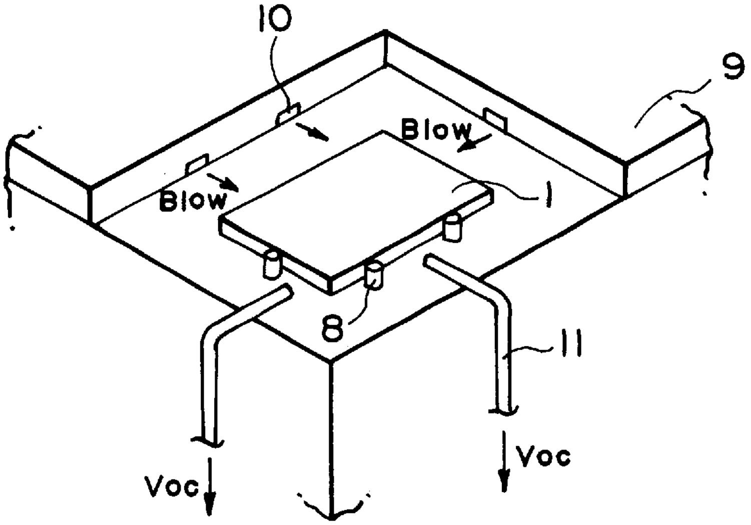
FIG. 11 shows an example of a conventional positioning method when heater boards are positioned on the base plate.

For the proper function of the image processing, the assured transportation to the image processing area is desirable. So, before the image processing, positioning is carried out to assure the proper transportation. FIG. 10 shows an example of a conventional positioning method. Designated by 7 is a mechanical abutment using cylinder or the like, and 8 is an abutment pin. The abutting portion 7 is driven by a cylinder or the like, and the heater board 1 is abutted to the pin 8 to effect the positioning of the heater board 1. However, with this method, a tipping may occur in the heater board. According to this embodiment, the positioning method as shown in FIG. 11 is used. In this Figure, designated by 9 is a compression air blowing portion, and 10 is an ejection outlet, and ejection outlet is a sucking portion. First, the compression air (0.1–0.15 kgf/cm$^2$) is supplied to the blowing portion 9, and it is ejected through the ejection outlet 10 to the heater board 1. Additionally, the sucking operation is effected in the sucking portion 11. The operation is repeated several times within 1.5 sec, and the positioning operation is carried out. With this positioning method, the heater board is floated by 0.3–0.5 mm during the positioning operation, the heater board is not damaged. With this positioning method, the reproducibility within ±5 microns is accomplished, so as to permit the stabilized transportation to the image processing area.

In the foregoing description, a monochromatic ink jet device or ink jet head has been dealt with, but the present invention is applicable to the case of using a plurality of ink jet heads using inks having different colors or inks having different densities. The ink jet head of the present invention is usable with a color ink jet device having a plurality of ink jet heads correspondingly to a plurality of color inks. In the foregoing, the ink has been liquid. However, it may be solid ink under the room temperature if it is liquefied at a temperature above the room temperature. Since the ink per se is heated to a temperature of not less than 30° C. and not more than 70° C. usually for the purpose of providing proper viscosity, the ink may be the one which is liquefied upon application of the print signal. The ink may be the one which is solid but is liquefied by heating.

The present invention is usable for a textile printing device or a textile printing system including a pre-processing apparatus and a post-processing apparatus, wherein the demand for the elongated ink jet head is high. A long ink jet head without print non-uniformity with high image quality with high resolution is possible in the textile printing device.

Additionally, with the ink jet head, a facsimile machine, a copying machine, a printer or the like is substantially free of the image disturbance. While the invention has been described with reference to the structures disclosed herein, it is not confined to the details set forth and this application is intended to cover such modifications or changes as may come within the purpose of the improvements or the scope of the following claims.

What is claimed is:

1. In a method of manufacturing an ink jet head which comprises a supporting member for supporting a plurality of substrates provided with ejection energy generating elements for generating energy for ejecting ink, and a top plate mounted on the substrates that cooperates with the substrates to cover all of the substrates to form ink flow paths containing the election energy generating elements, the improvement residing in the steps of:

providing the supporting member, at a contact portion with the substrates, with a plurality of through holes and recesses for receiving a bonding agent;

closely-contacting the substrates and the contact portion of the supporting member to close the through holes and the recesses;

temporarily fixing the substrates on the supporting member by applying suction via the through holes; and fixing the substrates on the supporting member by providing the bonding agent in the recesses.

2. The method according to claim 1, wherein providing the bonding agent comprises supplying an adhesive material into the recesses after placing of the substrates on the supporting portion.

3. The method according to claim 2, wherein the supporting members are provided with a plurality of interconnection grooves in fluid communication with the recesses, and wherein the adhesive material is supplied to the recesses through the interconnection grooves.

4. The method according to claim 1, wherein the substrates are temporarily fixed by photo-curing an adhesive material which is supplied through an adhesive material inlet in the supporting member during the temporarily fixing step.

* * * * *

UNITED STATES PATENT AND TRADEMARK OFFICE

CERTIFICATE OF CORRECTION

PATENT NO. : 5,826,333

DATED : October 27, 1998

INVENTOR(S): MASARU IKETANI, ET AL.

It is certified that error appears in the above-identified patent and that said Letters Patent is hereby corrected as shown below:

ON COVER PAGE AT [56], REFERENCES CITED, U.S. PAT. DOCS.
"5,243,755 9/1993 Inabe et al. "should read --5,243,755 9/1993 Inaba et al.--.

ON COVER PAGE AT [56], REFERENCES CITED, FOREIGN PATENT DOCUMENTS
"3216342" should read --3-216342-- and "4341860" should read --4-341860--.

COLUMN 1

Line 22, "in" should read --is--;
Line 36, "An" should read --And--;
Line 41, "heater" (first occurrence) should be and deleted;
Line 51, "of" (first occurrence) should be deleted.

COLUMN 2

Line 6, "have" should read - -has- -;
Line 56, "Shows a FIG. 10" should read --FIG. 10 shows an--; and
Line 63, "an" (first occurrence) should be deleted.

COLUMN 4

Line 30, "is" (second occurrence) should be deleted; and
Line 45, "an" should be deleted.

UNITED STATES PATENT AND TRADEMARK OFFICE

CERTIFICATE OF CORRECTION

PATENT NO. : 5,826,333

DATED : October 27, 1998

INVENTOR(S): MASARU IKETANI, ET AL.

It is certified that error appears in the above-identified patent and that said Letters Patent is hereby corrected as shown below:

COLUMN 5

Line 7, "this" (first occurrence) should be deleted;
Line 12, "an" should be deleted; and
Line 42, "of the" should read --of--.

COLUMN 6

Line 29, "are" should read --is--.

COLUMN 7

Line 5, "the" (second occurrence) should be deleted;
Line 10, "fixed" should read --fix--; and
Line 36, "portion," should read --portions,--.

COLUMN 8

Line 15, "the all" should read --all the--;
Line 56, "mount-" should be deleted; and
Line 57, "ing" should be deleted

COLUMN 9

Line 64, "finger" should read --fingers--; and
Line 65, "to" should be deleted.

UNITED STATES PATENT AND TRADEMARK OFFICE

CERTIFICATE OF CORRECTION

PATENT NO. : 5,826,333

DATED : October 27, 1998

INVENTOR(S): MASARU IKETANI, ET AL.

It is certified that error appears in the above-identified patent and that said Letters Patent is hereby corrected as shown below:

COLUMN 11

Line 42, "a" should be deleted;
Line 45, "a" should be deleted; and
Line 46, "of" (second occurrence) should be deleted.

COLUMN 12

Line 13, "discharging" should read --discharge--; and
Line 53, "flows" should read --flowed--.

COLUMN 13

Line 51, "the" should be deleted.

UNITED STATES PATENT AND TRADEMARK OFFICE

CERTIFICATE OF CORRECTION

PATENT NO. : 5,826,333

DATED : October 27, 1998

INVENTOR(S): MASARU IKETANI, ET AL.

It is certified that error appears in the above-identified patent and that said Letters Patent is hereby corrected as shown below:

COLUMN 14

Line 2, "operation," should read --operation and--; and
Line 40, "election" should read --ejection--.

Signed and Sealed this

Eighteenth Day of July, 2000

Attest:

Q. TODD DICKINSON

*Attesting Officer*

*Director of Patents and Trademarks*